US012570937B2

(12) United States Patent
Van Nuus

(10) Patent No.: US 12,570,937 B2
(45) Date of Patent: Mar. 10, 2026

(54) MASH FILTER MEMBRANE

(71) Applicant: Heineken Supply Chain B.V., Amsterdam (NL)

(72) Inventor: Martinus Adrianus Van Nuus, 's-Hertogenbosch (NL)

(73) Assignee: Heineken Supply Chain B.V., Amsterdam (NL)

( * ) Notice: Subject to any disclaimer, the term of this patent is extended or adjusted under 35 U.S.C. 154(b) by 757 days.

(21) Appl. No.: 17/261,619

(22) PCT Filed: Aug. 29, 2019

(86) PCT No.: PCT/NL2019/050553

§ 371 (c)(1),
(2) Date: Jan. 20, 2021

(87) PCT Pub. No.: WO2020/046122

PCT Pub. Date: Mar. 5, 2020

(65) Prior Publication Data

US 2021/0261893 A1 Aug. 26, 2021

(30) Foreign Application Priority Data

Aug. 29, 2018 (EP) .................................... 18191554

(51) Int. Cl.

| | |
|---|---|
| *C12C 7/165* | (2006.01) |
| *B01D 67/00* | (2006.01) |
| *B01D 69/02* | (2006.01) |
| *B01D 71/24* | (2006.01) |
| *B01D 71/80* | (2006.01) |

(52) U.S. Cl.
CPC ............ *C12C 7/165* (2013.01); *B01D 67/002* (2013.01); *B01D 69/02* (2013.01); *B01D 71/24* (2013.01); *B01D 71/80* (2013.01); *B01D 2323/30* (2013.01); *B01D 2325/24* (2013.01)

(58) Field of Classification Search
CPC ...... C12C 7/165; B01D 67/002; B01D 69/02; B01D 71/24; B01D 71/80; B01D 2323/30; B01D 2325/24
See application file for complete search history.

(56) References Cited

U.S. PATENT DOCUMENTS

| | | | |
|---|---|---|---|
| 5,453,285 A | 9/1995 | Versteegh | |
| 5,658,468 A | 8/1997 | Tigel Gil et al. | |
| 2002/0050477 A1 | 5/2002 | Lotz et al. | |
| 2012/0321875 A1* | 12/2012 | Nakahama | C08L 23/0815 |
| | | | 428/220 |
| 2015/0119515 A1 | 4/2015 | Frei et al. | |
| 2019/0300673 A1* | 10/2019 | Bergmann | C08K 5/10 |
| 2020/0277458 A1* | 9/2020 | Prissok | C08G 18/7664 |

FOREIGN PATENT DOCUMENTS

| | | | |
|---|---|---|---|
| CN | 101249324 A | * | 8/2008 |
| DE | 4313103 A1 | | 10/1994 |
| DE | 102005045167 A1 | | 3/2007 |
| EP | 0142173 A2 | | 5/1985 |
| EP | 0674929 B1 | | 10/1995 |
| EP | 2248571 A1 | | 11/2010 |
| RU | 2014149570 A | | 8/2016 |
| WO | 2010117288 A1 | | 10/2010 |
| WO | 2019048473 A1 | | 3/2019 |

OTHER PUBLICATIONS

English language machine translation of CN 101249324A, 5 pages, No Date.*
Amin Shabani et al., Rubber Chemistry and Technology, vol. 87, No. 4, pp. 679-702 (2014). (Year: 2014).*
Midwestern Rubber Sales, FDA White EPDM product information page, 3 Pages, Dec. 1, 2017. (Year: 2017).*
International Search Report & Written Opinion issued in corresponding PCT application No. PCT/NL2019/050553 dated Oct. 30, 2019, 9 pages.
Kunze, "Technology of Malt and Beer," 2001, pp. 270-279, 23 pages.
National Standard of the People's Republic of China, GB4806.Jan. 1994, "Hygienic Standards for Foodstuff Rubber Products", Issued on: Mar. 18, 1994, 6 pages.
Durometer & IRHD Hardness Tester, https://teclock.co.jp/pdf/en/12E_Durometer.pdf, 18 pages.
Mechanism of Peroxid Crosslinking of EPDM Rubber, Authors: M. von Duin, R. Peter, R. Orza, V. Chechik, KGK Rubberpoint, p. 458 bis 462, Sep. 2009, 5 pages.
Directive 2001/95/EC of the European Parliament and of the Council of Dec. 3, 2001 on general product safety, Official Journal of the European Communities, Jan. 15, 2002, 14 pages.
Regulation (EC) N. 1935/2004 of the European Parliament and of the Council of Oct. 27, 2004 on materials and articles intended to come into contact with food and repealing Directives 80/590/EEC and 89/109/EEC, Official Journal of the European Union, Nov. 13, 2004, 14 pages.
Commission Regulation (EC) of No. 2023/2006 of Dec. 22, 2006 on good manufacturing practice for materials and articles intended to come into contact with food, Official Journal of the European Union, Dec. 29, 2006, 4 pages.
Warenwetbesluit en—regeling verpakkingen en gebruiksartikelen (Besluit van 30 mei 2005 ivm Verordening EG nr. 1935-2004), 8 pages.
Regulation (EC) No. 1907/2006 of the European Parliament and of the Council of Dec. 18, 2006 concerning the Registration, Evaluation, Authorisation and Restriction of Chemicals (REACH) establishing a European Chemicals Agency, OJ L 396, Dec. 30, 2006, 347 pages.
21 CFR Part 177—Indirect Food Additives: Polymers §177.2600, Mar. 15, 1977, 10 pages.
National Standard of the People's Republic of China, GB4806.1-1994, "Hygienic Standards for Foodstuff Rubber Products", Issued on: Mar. 18, 1994, 6 pages.
Durometer & IRHD Hardness Tester, https://teclock.co.jp/pdf/en/12E_Durometer.pdf, 18 pages. No Date.

(Continued)

*Primary Examiner* — Pranav N Patel
(74) *Attorney, Agent, or Firm* — Banner & Witcoff, Ltd.

(57) ABSTRACT

The invention is directed to a mash filter membrane comprising an elastomeric composition that comprises more than 50 wt % of one or more elastomer, based on the total weight of polymers in the elastomeric composition.

18 Claims, No Drawings

(56) References Cited

OTHER PUBLICATIONS

Jean.-Pierre Queslel et al., "Rubber Elasticity and Characterization of Networks", Comprehensive Polymer Science and Supplements, vol. 2, 1989, pp. 271-309, 39 pages.
Membrane nach Membranzeichnung 3-13556 aus dem Werkstoff EPDM E2268 aus Membranform G21691 ("EPDM Membran"), 11 pages. No Date.
Prospekt der Firma Hansen-BTR GmbH, 8 pages. No Date.
Auszug aus der Warenwetbesluit verpakkingen en gebruiksartikelen, 2 pages. No Date.

* cited by examiner

MASH FILTER MEMBRANE

The invention is in the field of brewing beverages like beer. In particular, the invention is directed to a mash filter membrane for use in the filtration of mash.

Mashing is typically a process step in brewing wherein milled grain and water are combined and heated to form and extract the sugars and other components from the grains to form mash, which is a suspension comprising wort and solid, spent grain. To continue the wort further into the brewing process, it needs to be separated from the spent grain in the mash in a mash filtration or lautering process. In large scale breweries, this is typically carried out with a mash filtration unit, such as for instance a mash filtration unit described in EP0674929 and commercially available from Meura S.A., Belgium. Other, similar types of mash filtration units are commercially available from Landaluce S.A., Spain and Lehui, China.

In U.S. Pat. No. 5,453,285, an example of a mash filtration is described. Typically, in such a process, mash is led into chambers of a mash filtration unit, between a filter, generally a cloth filter, and a membrane, occasionally also referred to as bladder. The membrane is used to apply pressure on the mash such that the wort is pushed through the filter out of the mash. The remaining spent grain bed, that is positioned (sandwiched) between the filter and the membrane can optionally be rinsed with hot water, to further extract remaining sugars from the spent grain bed. Once the filtration has finished, the chambers are opened to release the spent grain bed and the cycle can be repeated with another brew or batch of mash.

As for instance described in EP0674929, the mash filter membrane is elastic to a certain extent, such that it can be deflated when mash is introduced into the chamber and inflated to apply further pressure (e.g. about maximum 1200 mbar) on the mash.

Conventional mash filter membranes, such as those commercially available from Meura S.A., are associated with a number of drawbacks. After a certain number of brews, the membrane's structural integrity fails due to breaks or tears such that the membrane must be replaced. This replacement requires undesired downtime of the filtration unit. Moreover, problematically, the frequency of failure of the membrane is relatively unpredictable, meaning that one membrane of a particular type may last longer than another membrane of the same type. This is indicative of a variable rubber composition for each membrane. This unpredictable durability of conventional membrane makes it difficult to schedule maintenance and leads to even more downtime. In addition to tearing or breaking, conventional mash filter membranes tend to form creases or folds over time. Creasing not only influences the structural integrity of the membrane but also hampers the release of the spent grain bed from the opened chambers, as the spent grain bed remains hanging on the creases. This requires manual aid in releasing the spent grain bed, which is undesirable for sake of efficiency and safety. Another drawback of the conventional mash filter membranes is their stickiness, in particular in the first two brews after a cleaning in place (CIP) has been carried out.

DE4313103 discloses a membrane filter system and an elastomeric membrane sheet. However, as is more common the art, the sheet is consider elastomeric while it is explicitly disclosed that that a part the sheet is not elastomeric. Moreover, it is known that conventional membranes, even if having elastomeric properties, may nonetheless contain less than 50% elastomers.

In EP0142173, a diaphragm for a filter press is disclosed. It is described that the diaphragm shows good heat-resistance and thermal aging resistance or chemical resistance vis-à-vis other diaphragms made of rubber. No information on its suitability in mash filtration, let alone its advantages therein are however known from EP0142173.

It is an object of the present invention to provide an improved mash filter membrane that does not suffer from one or more of the drawbacks, such as the above, associated with conventional membranes. In particular, it is an object to provide a more durable mash filter membrane than the conventional membranes such that no or less replacements are required.

The present inventors surprisingly found that this object can be met by providing a mash filter membrane that retains its elasticity for a large number of brews. To this end, the invention provides a mash filter membrane comprising an elastomeric composition that comprises more than 50 wt % of one or more elastomer, based on the total amount of polymers in the elastomer composition.

The term elastomer herein means a polymer having elastic properties and includes natural and synthetic elastomers, which are also referred to as rubbers. Preferably, the elastomer of the present invention comprises synthetic elastomer for good control of its properties.

Certain conventional mash filter membranes comprise a elastomeric composition that is based on the elastic copolymer ethylene propylene diene monomer (EPDM) and a non-elastic thermoplastic polymer (also referred to as plastic or thermoplastic phase) such a polyethylene (PE) or polypropylene (PP). For instance, in the mash filter membrane provide by Meura S.A., Belgium, the composition comprises 50% EPDM and 50% PE. Since the elastic properties of the membrane can mostly be contributed to EPDM, conventional membranes may occasionally be referred to as EPDM membranes, even though the membranes do contain a plastic such as PE. Due to the presence of plastic on the conventional compositions, the compositions can be regarded as plastics such that obtaining food grade rating according to the regulation set forth by the relevant authorities (e.g. the U.S. Food and Drug Administration, FDA the Dutch Nederlandse Voedsel-en Warenautoriteit, NVWA) is facilitated. For instance, the conventional plastics-containing elastomeric composition may be in accordance with EU Regulations (EU) 10/2011 and/or EU Regulations (EU) 282/2008. Without wishing to be bound by theory, is the inventors believe that the presence of the plastic in the elastomeric composition negatively influences the durability of the membrane.

It is preferred that the present elastomeric composition comprises as less plastic as possible. Although, positive effect of less than 50 wt % plastic may already be observed, an elastomeric composition comprising more than 60% in particular shows an improved durability. The increase in durability is observable concomitantly with the increase in the amount of the elastomer in the composition. Accordingly, the composition comprises preferably more than 80, preferably more than 90, more preferably more than 95, most preferably about 100 wt % of said elastomers, based on the total weight of polymers in the elastomeric composition. Thus, most preferably, the elastomeric composition is essentially free of plastic.

The limited or none-use of plastic in the present elastomeric composition can alternatively, or additionally be expressed as that the elastomeric composition comprises less than 50% of one or more inelastic polymers such as inelastic thermoplastic polymers, preferably less than 25%, more preferably less than 10%, based on the total weight of polymers in the elastomeric composition. The inelastic polymers are typically polyolefin homopolymers, such as one or more polymers selected from the group of polyethylene, polypropylene, polystyrene and the like.

The elastomeric composition is preferably well resistant to an alkaline solution (e.g. a 2% alkaline solution) which can be used for CIP purposes. Accordingly, the elastomer comprises preferably EPDM. Other suitable elastomers may be one or more selected from the group consisting of EPDM, FKM (according to ASTM D1418 standard—e.g. Viton™), FFKM (according to ASTM D1418 standard—e.g. Kalrez™), nitrile butadiene rubber (NBR).

In a particular embodiment, the elastomer preferably comprises a copolymer such as a block-copolymer like triblock copolymers polystyrene-block-polybutadiene-block-polystyrene (SBS), polystyrene-block-polyisobutene-block-polystyrene (SIS). In another particular embodiment, the elastomer comprises an olefinic elastomer such as ethylene propylene rubber (EPR), nitrile butadiene rubber (NBR) EPDM, polystyrene-co-polybutadiene rubber (SBR).

It may be appreciated that the elastomeric composition may further comprise additives such as fillers like carbon black, curing agents, stabilizers, plasticizer, and the like. The elastomeric composition of the present invention is preferably cured or cross-linked by peroxide. Conventional elastomeric compositions for membranes are cured or cross-linked by sulfur, and it was found that curing or cross-linking by peroxide results in a more durable membrane. Cross-linking or curing by sulfur is therefore less preferred.

In a particular embodiment, the membrane consists essentially entirely of the elastomeric composition. In another embodiment, the membrane may comprise the composition and a layer or patches of another composition, for instance a perfluorated compound (PFC) composition, located on the side of the membrane that is intended to contact the mash. The advantage of the perfluorated compound is its inertness, such that the durability of the membrane may be further improved.

The elastomeric composition of the present invention is preferably food grade. This can surprisingly also be attained for the elastomeric composition essentially consisting of EPDM. As such, the inventors found that it is not required for regulatory purposes to include at least 50% plastic in the composition as is the case for conventional elastomeric compositions. The elastomeric composition of the present invention can comply with the regulation laid according to EU Directive 95/2001/EC on general product safety, Regulation (EC) N. 1935/2004 on materials and articles intended to come into contact with food, Dutch Food and consumer items law (including but not limited to the (Commodities Act) decree and regulation on packaging and consumer items ("Warenwetbesluit en-regeling verpakkingen en gebruiksartikelen"), article 33 of EU Regulation (EC) 1907/2006 such that no substances of very high concern as defined by the REACH legislation are present above 0.1% by weight, and/or according to Food and Drug Administration (FDA) CFR Title 21—Part 177—Indirect Food Additives: Polymers § 177.2600 Rubber articles intended for repeated use. This means that the present elastomeric composition preferably only comprises components is such a way that these components remaining below the Overall Migration Limit set out in Regulation (EC) N. 1935/2004. This testing can be carried out according to the relevant legislation, for instance according to US Code of Federal Regulations Title 21, EU Directive 82/711/EEC, EU Directive 93/8/EEC, EU Directive 97/48/EC laying down the basic rules necessary for testing migration of the constituents of plastic materials and articles intended to come into contact with foodstuffs and/or EU Directive 85/572/EEC laying down the list of simulants to be used for testing migration. Suitable components and additives to this end for the elastomeric composition can also be found on the so-called 'whitelist' that is associated with these regulations. Preferably, the elastomeric composition of the present invention also meets the requirements laid down in Regulation (EC) N. 2023/2006 Good Manufacturing Practices.

A further aspect of the invention is a method for the production of the membrane. Conventionally, membranes are generally produced by compression molding. A drawback of this method is that it allows for a limited control over process parameters. For instance, segregation of the starting materials such as the raw EPDM and raw PE pellets may occur, which will result in a heterogeneous final composition. The present inventor found that the infrequent durability of conventional membrane may be contributed to the poor control of the process in the compression molding. Accordingly, the membrane of the present invention is preferably prepared by a molding process comprising blending of a melt of the composition, as is for instance carried out in injection molding. It was found that injection molding leads to more narrow distribution of the durability of the membrane. As such, the membrane of the present invention is preferably obtainable by molding process comprising blending of a melt of the composition such as injection molding. This method was also found particularly suitable for the production of the relatively large sized membranes in accordance with the present invention, which may have a typically one-sided surface area of more than 1, preferably more than 2, more preferably more than 3, even more preferably more than 3.5, most preferably about 3.6 $m^2$.

For a particularly favorable durability of the membrane, it was found that the elastomeric composition, before use of said membrane, has preferably one or more, more preferably all of the following material properties:

a tensile strength determined according to ISO 37:2011, type 2, of more than 5, preferably more than 8, more preferably more than 10 MPa, such as about 12 MPa;

a modulus M300 deformation determined according to ISO 37:2011, type 2, of more than 4, preferably more than 4.5, more preferably more than 5 MPa, such as about 8.6 MPa;

an elongation at break determined according to ISO 37:2011, type 2, of more than 200%, preferably more that 300%, even more preferably more than 400%, such as about 421%;

a density determined according to UNI EN ISO 1183-1, of more than 1 $g/cm^3$, such as about 1.06 $g/cm^3$;

a Shore A hardness determined according to UNI ISO 7619-1, in the range of 60 to 75, preferably 65 to 71 ShA, such as about 66 ShA.

Each of the above-mentioned material properties contribute to the favorable characteristic of the elastomeric composition. It was found, that the change of the material properties over time, i.e. during use, may be indicative of the durability of the membrane. The elastomeric composition is therefore preferably composed in such a way that the material properties vary as little as possible due to usage. It was found that this is particularly the case for the material property compression set, determined after 72 hours at 70° C. according to ISO 815-1:2014, method A, test piece B. In fact, it is believed that the compression set can particularly be used as a reliable parameter for determining the durability of the elastomeric composition. In general, compression set is indicative for the elasticity of the composition. Although the initial compression set for conventional membranes such as that available from Meura S.A., Belgium (i.e. ca. 40%), is sufficient for an effective mash filtration process, it was found that due to usage of a typical conventional membrane in such a process, the compression set of the membrane increases (e.g. to ca. 59% after 4700 brews). In contrast, the compression set of the membrane according to the present invention remains essentially constant over 4700 brews. Accordingly, the mash filter membrane of the present invention preferably has a compression set of less than 35%, more preferably less than 25%, before use of said membrane, and/or a a compression set of less than 50%, more preferably less than 25%, most preferably less than 20% after 4700 brews of about 2 hours or 90 weeks of using said membrane.

A further aspect of the present invention is directed to the use of the mash filter membrane or the mash filtration unit in the filtration of mash. In other words, in a particular aspect, the invention is directed to a method comprising the filtration of mash using the mash filter membrane or the mash filtration unit comprising said membrane. More specifically, said method comprises applying pressure with the membrane on mash such that wort is pushed through a filter out of the mash.

The invention can be illustrated by the following examples.

EXAMPLE 1—PRODUCTION OF MEMBRANE

In a mold, a mash filter membrane comprising a elastomeric composition comprising black, peroxide-cured 100% EPDM (based on the total weight of polymers in the composition) was produced by injection molding. The membrane had a size of 2 by 1.8 m$^2$ and the material properties as indicated in Table 1.

TABLE 1

| Material property | Method | Value |
|---|---|---|
| Density | UNI EN ISO 1183-1 | 1.06 g/cm$^3$ |
| Shore A hardness | UNI ISO 7619-1 | 66 ShA |
| Tensile strength | ISO 37:2011, type 2 | 12 MPa |
| Elongation at break | ISO 37:2011, type 2 | 421% |
| Modulus 25% | ISO 37:2011, type 2 | 1.0 |
| Modulus 50% | ISO 37:2011, type 2 | 1.6 |
| Modulus 100% | ISO 37:2011, type 2 | 3.1 |
| Modulus 200% | ISO 37:2011, type 2 | 6.2 |
| Modulus 300% | ISO 37:2011, type 2 | 8.6 |
| Tear resistance, maximum force | ISO 34-1:2015, method C | 53N |
| Tear resistance, tear resistance | ISO 34-1:2015, method C | 28 KN/m |
| Compression set | ISO 815-1:2014, method A | 23% |

Comparative Example 1—Analysis of Conventional Membrane

A mash filter membrane of 2 by 1.8 m$^2$ available from Meura S.A., Belgium, having a composition of 50 wt % EPDM and 50% PE was analyzed before use and the following material properties as indicated in Table 2 were found.

TABLE 2

| Material property | Method | Value |
|---|---|---|
| Density | UNI EN ISO 1183-1 | 0.95 g/cm$^3$ |
| Shore A hardness | UNI ISO 7619-1 | 75 ShA |
| Tensile strength | ISO 37:2011, type 2 | 8.1 MPa |
| Elongation at break | ISO 37:2011, type 2 | 548% |
| Modulus 25% | ISO 37:2011, type 2 | 2 |
| Modulus 50% | ISO 37:2011, type 2 | 2.6 |
| Modulus 100% | ISO 37:2011, type 2 | 3.2 |
| Modulus 200% | ISO 37:2011, type 2 | 4.2 |
| Modulus 300% | ISO 37:2011, type 2 | 5.1 |
| Tear resistance, maximum force | ISO 34-1:2015, method C | 59N |
| Tear resistance, tear resistance | ISO 34-1:2015, method C | 24 kN/m |
| Compression set | ISO 815-1:2014, method A | 40% |

EXAMPLE 2—EVALUATION OF STICKINESS OF MEMBRANES

One mash filtration unit commercially available from Meura S.A. was equipped with 138 mash filter membranes as prepared in Example 1. Another mash filtration unit of the same type, was equipped with 138 conventional mash filter membranes are referred to in Comparative example 1. Both mash filtration units were placed in the same room, fed with the same brews (mash) and treated similarly (expect when maintenance was due, vide infra) as they were running parallel in the brewing process.

The stickiness of the membranes was analyses by regarding the required manual, operational assistance needed to remove the spent grain bed from membrane after a daily or monthly CIP. The results are provided in Table 3.

TABLE 3

| Type of CIP | | Test moment | Membrane of Example 1 | Conventional membrane of Comp. ex. 1 |
|---|---|---|---|---|
| week 1 | weekly CIP | first brew | 3 out of 10 | 7 out of 10 |
| | | second brew | 2 out of 10 | 5 out of 10 |
| | | third brew | none | 3 out of 10 |
| week 3 | monthly CIP | first brew | 1 out of 10 | 5 out of 10 |
| | | second brew | none | 3 out of 10 |
| | | third brew | none | 1 out of 10 |
| week 5 | Weekly CIP | first brew | 1 out of 10 | 5 out of 10 |
| | | second brew | none | 3 out of 10 |
| | | third brew | none | 1 out of 10 |
| week 6 and on | weekly or montly | comparable to week 5 | | |

The results in Table 3 show that the membrane of the present invention is less sticky than the conventional membrane during operational conditions.

EXAMPLE 3—EVALUATION OF MEMBRANE DURABILITY

The filtrations units of Example 2 were used for filtration during a time period of approximately 90 weeks, wherein 4700 brews were produces for which the mash was filtered. During this time, the conventional mash filter membranes as referred to in Comparative example 1 had a fail rate of 13% (18 out of 138), while the mash filter membranes of the present invention according to Example 1 had a fail rate of 0% (0 out of 138). Moreover, none of the membranes of the present invention showed any creases, while significant creasing was observed for the conventional filters.

After 4700 brews of about 2 hours in 90 weeks, samples of both types of mash filters membranes were analyzed for the membrane properties indicated in Table 4, using the same methods as indicated in Tables 1 and 2.

TABLE 4

| Material property | Membrane of Example 1 | Conventional membrane of Comp. ex. 1 |
|---|---|---|
| Density | 1.06 g/cm$^3$ | 0.98 g/cm$^3$ |
| Shore A hardness | 70 ShA | 75 ShA |
| Tensile strength | 11.2 MPa | 6.3 MPa |
| Elongation at break | 234% | 425% |
| Modulus 25% | 1.3 | 1.4 |
| Modulus 50% | 2.4 | 2.2 |
| Modulus 100% | 4.9 | 2.9 |
| Modulus 200% | 9.5 | 2.9 |
| Modulus 300% | n.d. | 4.7 |
| Tear resistance, maximum force | 51N | 49N |
| Tear resistance, tear resistance | 24 kN/m | 22 kN/m |
| Compression set | 15% | 59% |

From Table 2, it can be concluded that, comparing both the conventional membranes with the membranes of the present invention, the membranes of the present invention have a significantly higher strength and this stays relative constant in time up till now, whereas the conventional membranes lose some of its initially already lower strength and stiffness. The tear strength of the membranes of the present invention is initially higher and this is still the case after 4700 brews and also the permanent deformation (compression set) of the test membranes is significantly less, which is better as compression set is preferred to be as low as possible for this kind of applications.

The invention claimed is:

1. Mash filter membrane comprising an elastomeric composition that comprises 100 wt % of copolymer ethylene propylene diene monomer (EPDM), based on a total weight of polymers in the elastomeric composition,
   wherein the elastomeric composition is a food grade composition,
   wherein the elastomeric composition, before use of said membrane, has a Shore A hardness determined according to UNI ISO 7619-1, in the range of 60 to 71 ShA.

2. Mash filter membrane in accordance with claim 1, having a compression set determined after 72 hours at 70° C. according to ISO 815-1:2014, method A, test piece B, of less than 35%, wherein the compression set is determined before use of said membrane.

3. Mash filter membrane in accordance with claim 1, having a compression set determined after 72 hours at 70° C. according to ISO 815-1:2014, method A, test piece B, of less than 50% wherein the compression set is determined after 4700 brews or 90 weeks of using said membrane.

4. Mash filter membrane in accordance with claim 1, wherein the elastomeric composition, before use of said membrane, has one or more, of the following material properties:
   a tensile strength determined according to ISO 37:2011, type 2, of more than 5 MPa;
   a modulus M300 deformation determined according to ISO 37:2011, type 2, of more than 4 MPa;
   an elongation at break determined according to ISO 37:2011, type 2, of more than 200%;
   a density determined according to UNI EN ISO 1183-1, of more than 1 g/cm$^3$

8 a Shore A hardness determined according to UNI ISO 7619-1, in the range of 60 to 75 ShA.

5. Mash filter membrane in accordance with claim 1, wherein the elastomeric composition is a food grade composition according to EU Directive 95/2001/EC on general product safety, Regulation (EC) N. 1935/2004 on materials and articles intended to come into contact with food, EU Regulation 2023/2006 on good manufacturing practice for materials and articles intended to come into contact with food, Dutch Food and consumer items law (including but not limited to the (Commodities Act) decree and regulation on packaging and consumer items ("Warenwetbesluit en-regeling verpakkingen en gebruiksartikelen"), article 33 of EU Regulation (EC) 1907/2006 such that no substances of very high concern as defined by the REACH legislation are present above 0.1% by weight, and/or according to Food and Drug Administration (FDA) CFR Title 21—Part 177—Indirect Food Additives: Polymers § 177.2600 Rubber articles intended for repeated use.

6. Mash filter membrane in accordance with claim 1, having a one-sided surface area of more than 1 m$^2$.

7. Mash filter membrane in accordance with claim 1, wherein the elastomeric composition is cured or crosslinked by peroxide.

8. Mash filtration unit comprising the mash filter membrane in accordance with claim 1.

9. Mash filter membrane in accordance with claim 1, having a compression set determined after 72 hours at 70° C. according to ISO 815-1:2014, method A, test piece B, of less than 25% wherein the compression set is determined before use of said membrane.

10. Mash filter membrane in accordance with claim 1, having a compression set determined after 72 hours at 70° C. according to ISO 815-1:2014, method A, test piece B, of less than 25% wherein the compression set is determined after 4700 brews or 90 weeks of using said membrane.

11. Mash filter membrane in accordance with claim 1, having a compression set determined after 72 hours at 70° C. according to ISO 815-1:2014, method A, test piece B, of less than 20% wherein the compression set is determined after 4700 brews or 90 weeks of using said membrane.

12. Mash filter membrane in accordance with claim 1, wherein the elastomeric composition, before use of said membrane, has one or more of the following material properties:
   a tensile strength determined according to ISO 37:2011, type 2, of more than 8 MPa;
   a modulus M300 deformation determined according to ISO 37:2011, type 2, of more than 4 MPa;
   an elongation at break determined according to ISO 37:2011, type 2, of more than 300;
   a density determined according to UNI EN ISO 1183-1, of more than 1 g/cm$^3$;
   a Shore A hardness determined according to UNI ISO 7619-1, in the range of 65 to 71 ShA.

13. Mash filter membrane in accordance with claim 1, wherein the elastomeric composition, before use of said membrane, has one or more of the following material properties:
   a tensile strength determined according to ISO 37:2011, type 2, of more than 10 MPa;
   a modulus M300 deformation determined according to ISO 37:2011, type 2, of more than 5 MPa;
   an elongation at break determined according to ISO 37:2011, type 2, of more than 400;
   a density determined according to UNI EN ISO 1183-1, of more than 1 g/cm$^3$;

a Shore A hardness determined according to UNI ISO 7619-1, in the range of 65 to 71 ShA.

14. Mash filter membrane in accordance with claim 1, wherein the elastomeric composition, before use of said membrane, has one or more of the following material properties:

a tensile strength determined according to ISO 37:2011, type 2, of about 12 MPa;

a modulus M300 deformation determined according to ISO 37:2011, type 2, of about 8.6 MPa;

an elongation at break determined according to ISO 37:2011, type 2, of about 420;

a density determined according to UNI EN ISO 1183-1, of about 1.06 g/cm$^3$;

a Shore A hardness determined according to UNI ISO 7619-1, of about 66 ShA.

15. Mash filter membrane in accordance with claim 1, having a one-sided surface area of more than 2 m$^2$.

16. Mash filter membrane in accordance with claim 1, having a one-sided surface area of more than 3 m$^2$.

17. Mash filter membrane in accordance with claim 1, having a one-sided surface area of about 3.6 m$^2$.

18. Mash filter membrane in accordance with claim 1, further comprising one or more of a filler, a curing agent, a stabilizer or a plasticizer.

\* \* \* \* \*